US012693992B2

(12) United States Patent
Jain et al.

(10) Patent No.: US 12,693,992 B2
(45) **Date of Patent: *Jul. 28, 2026**

(54) USAGE CORRECTION IN A FILE SYSTEM

(71) Applicant: Druva Inc., Santa Clara, CA (US)

(72) Inventors: Somesh Jain, Pashan (IN); Shubham Agarwal, Rajasthan (IN); Rohit Singh, Ghaziabad (IN)

(73) Assignee: Druva Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/823,387

(22) Filed: Sep. 3, 2024

(65) Prior Publication Data

US 2024/0427732 A1     Dec. 26, 2024

Related U.S. Application Data

(63) Continuation of application No. 18/095,953, filed on Jan. 11, 2023, now Pat. No. 12,086,102.

(30) Foreign Application Priority Data

Jan. 13, 2022     (IN) ............................. 202241002128

(51) Int. Cl.
    *G06F 16/11*          (2019.01)
    *G06F 11/14*          (2006.01)
                (Continued)

(52) U.S. Cl.
    CPC ........ *G06F 16/128* (2019.01); *G06F 11/1435* (2013.01); *G06F 11/1453* (2013.01); *G06F 11/1466* (2013.01); *G06F 11/1469* (2013.01);

*G06F 16/125* (2019.01); *G06F 16/13* (2019.01); *G06F 16/162* (2019.01); *G06F 16/172* (2019.01); *G06F 16/1744* (2019.01); *G06F 16/1748* (2019.01); *G06F 16/90335* (2019.01); *G06F 2201/84* (2013.01)

(58) Field of Classification Search
    CPC ............................. G06F 16/128; G06F 16/172
    See application file for complete search history.

(56) References Cited

U.S. PATENT DOCUMENTS 9,256,629 B1 *   2/2016   Bono ...................... G06F 16/10
11,080,237 B2    8/2021   Wenzel
                    (Continued)

*Primary Examiner* — Kris E Mackes
(74) *Attorney, Agent, or Firm* — Fenwick & West LLP

(57) ABSTRACT

A data management system may maintain a total-size counter for the file system. The total-size counter represents a sum of data size related to snapshots backed up to the file system. The data management system may perform data operation cycles to the file system. Each data operation cycle corresponds to a snapshot that includes files. Each data operation cycle may include incrementing the total-size counter by the data size of the files in the snapshot exchanged with the file system and adding, to a snapshot record, the amount of increment in incrementing the total-size counter as an increment-size counter. A data management system may perform a correction operation to correct the total-size counter. The correction operation may change the total-size counter by a difference between the total of the increment-size counters in the snapshot records and the total data size of file data exchanged with the file system.

20 Claims, 8 Drawing Sheets

(51) Int. Cl.

| | |
|---|---|
| *G06F 11/1446* | (2026.01) |
| *G06F 16/13* | (2019.01) |
| *G06F 16/16* | (2019.01) |
| *G06F 16/172* | (2019.01) |
| *G06F 16/174* | (2019.01) |
| *G06F 16/903* | (2019.01) |

(56) References Cited

U.S. PATENT DOCUMENTS

| | | | |
|---|---|---|---|
| 2012/0259815 A1* | 10/2012 | Olson ................. | G06F 11/1464 |
| | | | 707/649 |
| 2019/0108099 A1* | 4/2019 | Mazumdar .......... | G06F 11/1451 |
| 2020/0012619 A1* | 1/2020 | Gupta ................. | G06F 16/9027 |
| 2020/0065195 A1 | 2/2020 | Benboubakeur | |
| 2020/0142971 A1* | 5/2020 | Matsui .................. | G06F 3/0619 |
| 2020/0201814 A1 | 6/2020 | Danilov et al. | |
| 2020/0226029 A1 | 7/2020 | Borate et al. | |

* cited by examiner

100

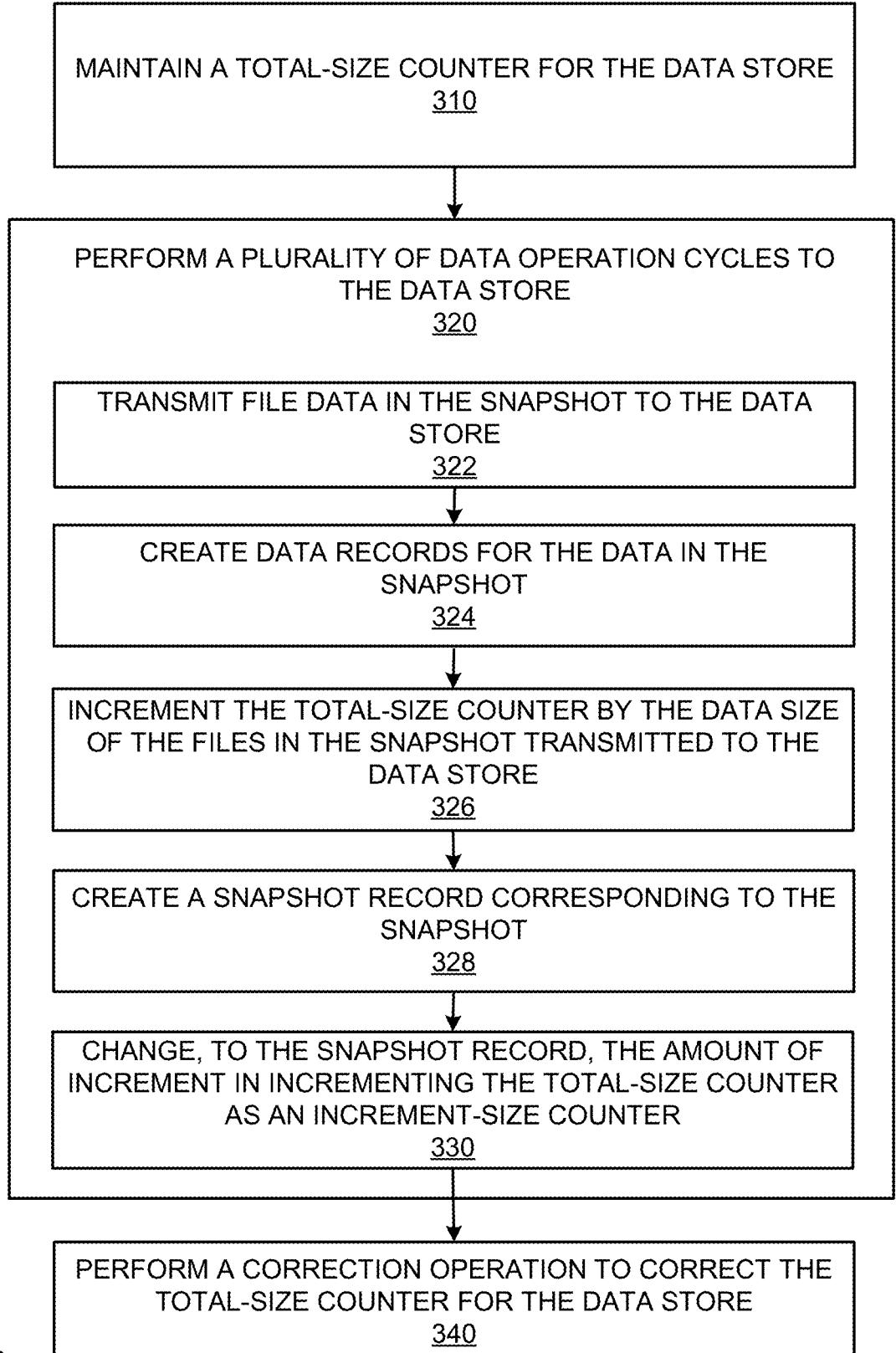

MAINTAIN A TOTAL-SIZE COUNTER FOR THE DATA STORE
310

PERFORM A PLURALITY OF DATA OPERATION CYCLES TO THE DATA STORE
320

TRANSMIT FILE DATA IN THE SNAPSHOT TO THE DATA STORE
322

CREATE DATA RECORDS FOR THE DATA IN THE SNAPSHOT
324

INCREMENT THE TOTAL-SIZE COUNTER BY THE DATA SIZE OF THE FILES IN THE SNAPSHOT TRANSMITTED TO THE DATA STORE
326

CREATE A SNAPSHOT RECORD CORRESPONDING TO THE SNAPSHOT
328

CHANGE, TO THE SNAPSHOT RECORD, THE AMOUNT OF INCREMENT IN INCREMENTING THE TOTAL-SIZE COUNTER AS AN INCREMENT-SIZE COUNTER
330

PERFORM A CORRECTION OPERATION TO CORRECT THE TOTAL-SIZE COUNTER FOR THE DATA STORE
340

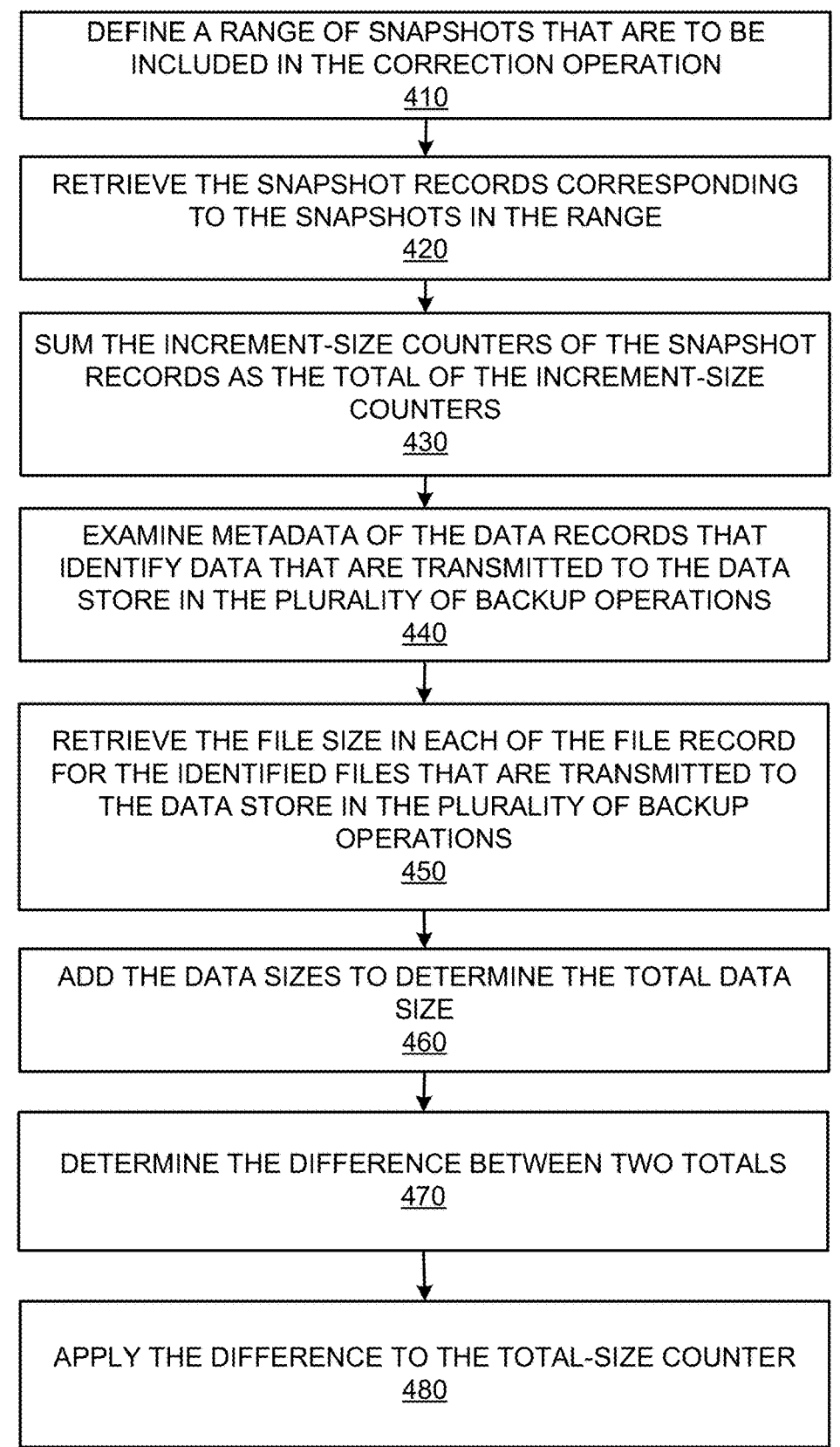

DEFINE A RANGE OF SNAPSHOTS THAT ARE TO BE
INCLUDED IN THE CORRECTION OPERATION
410

RETRIEVE THE SNAPSHOT RECORDS CORRESPONDING
TO THE SNAPSHOTS IN THE RANGE
420

SUM THE INCREMENT-SIZE COUNTERS OF THE SNAPSHOT
RECORDS AS THE TOTAL OF THE INCREMENT-SIZE
COUNTERS
430

EXAMINE METADATA OF THE DATA RECORDS THAT
IDENTIFY DATA THAT ARE TRANSMITTED TO THE DATA
STORE IN THE PLURALITY OF BACKUP OPERATIONS
440

RETRIEVE THE FILE SIZE IN EACH OF THE FILE RECORD
FOR THE IDENTIFIED FILES THAT ARE TRANSMITTED TO
THE DATA STORE IN THE PLURALITY OF BACKUP
OPERATIONS
450

ADD THE DATA SIZES TO DETERMINE THE TOTAL DATA
SIZE
460

DETERMINE THE DIFFERENCE BETWEEN TWO TOTALS
470

APPLY THE DIFFERENCE TO THE TOTAL-SIZE COUNTER
480

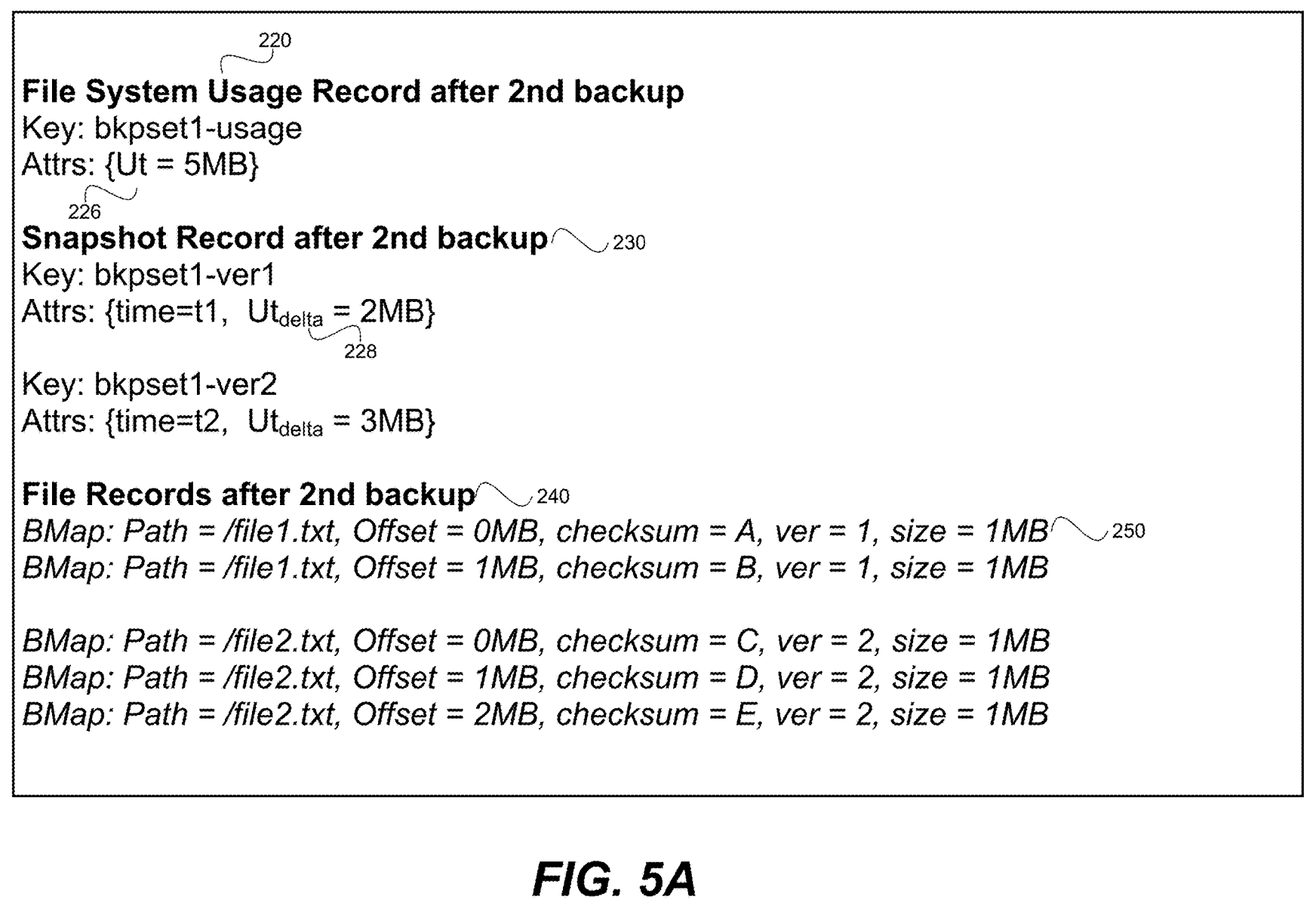

File System Usage Record after 2nd backup _220_

Key: bkpset1-usage

Attrs: {Ut = 5MB} _226_

Snapshot Record after 2nd backup _230_

Key: bkpset1-ver1

Attrs: {time=t1,   $Ut_{delta}$ = 2MB} _228_

Key: bkpset1-ver2

Attrs: {time=t2,   $Ut_{delta}$ = 3MB}

File Records after 2nd backup _240_

BMap: Path = /file1.txt, Offset = 0MB, checksum = A, ver = 1, size = 1MB _250_

BMap: Path = /file1.txt, Offset = 1MB, checksum = B, ver = 1, size = 1MB

BMap: Path = /file2.txt, Offset = 0MB, checksum = C, ver = 2, size = 1MB

BMap: Path = /file2.txt, Offset = 1MB, checksum = D, ver = 2, size = 1MB

BMap: Path = /file2.txt, Offset = 2MB, checksum = E, ver = 2, size = 1MB

*FIG. 5A*

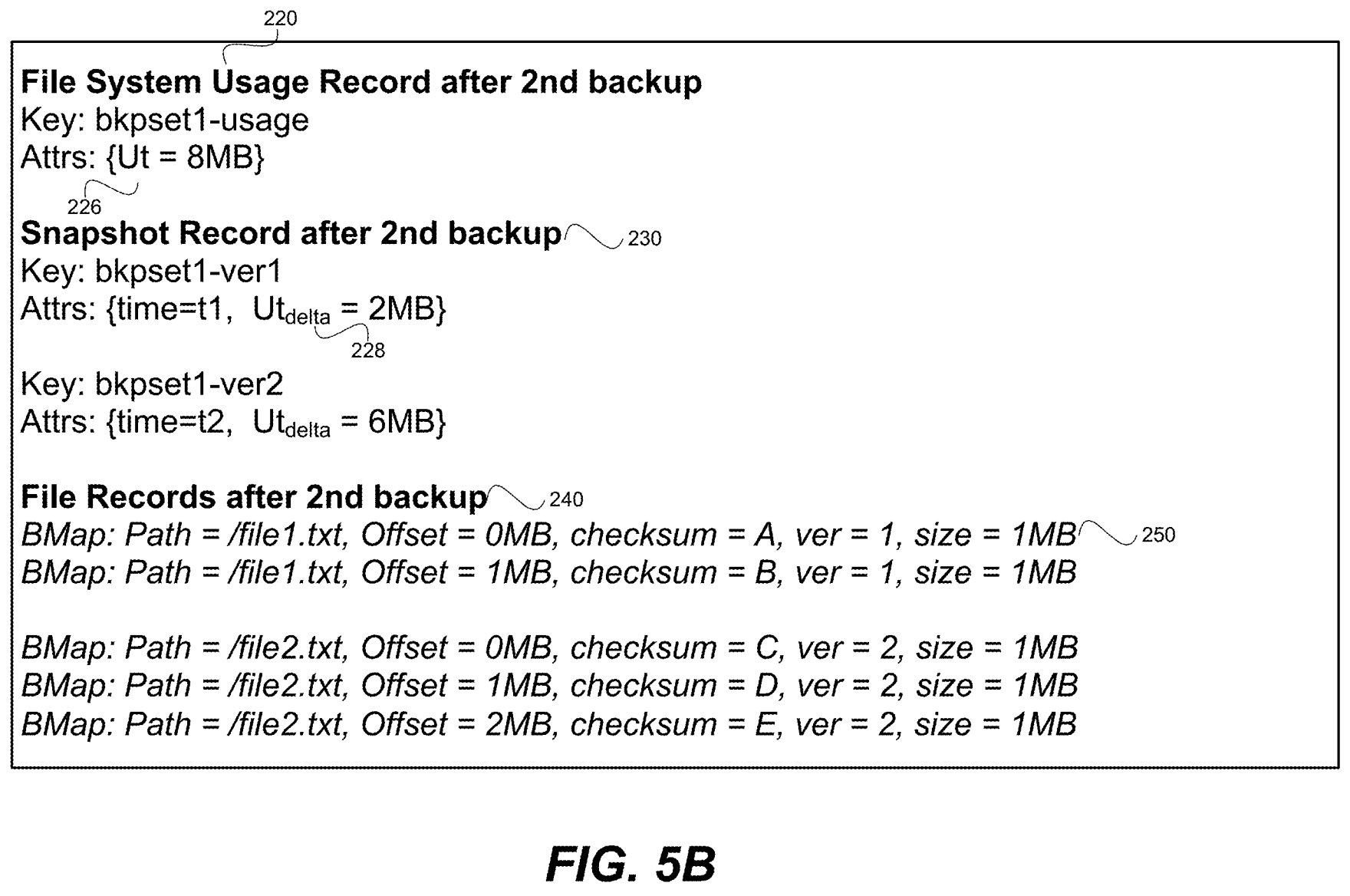

File System Usage Record after 2nd backup
Key: bkpset1-usage
Attrs: {Ut = 8MB} — 226

220

Snapshot Record after 2nd backup — 230
Key: bkpset1-ver1
Attrs: {time=t1, $Ut_{delta}$ = 2MB} — 228

Key: bkpset1-ver2
Attrs: {time=t2, $Ut_{delta}$ = 6MB}

File Records after 2nd backup — 240
BMap: Path = /file1.txt, Offset = 0MB, checksum = A, ver = 1, size = 1MB — 250
BMap: Path = /file1.txt, Offset = 1MB, checksum = B, ver = 1, size = 1MB BMap: Path = /file2.txt, Offset = 0MB, checksum = C, ver = 2, size = 1MB
BMap: Path = /file2.txt, Offset = 1MB, checksum = D, ver = 2, size = 1MB
BMap: Path = /file2.txt, Offset = 2MB, checksum = E, ver = 2, size = 1MB

*FIG. 5B*

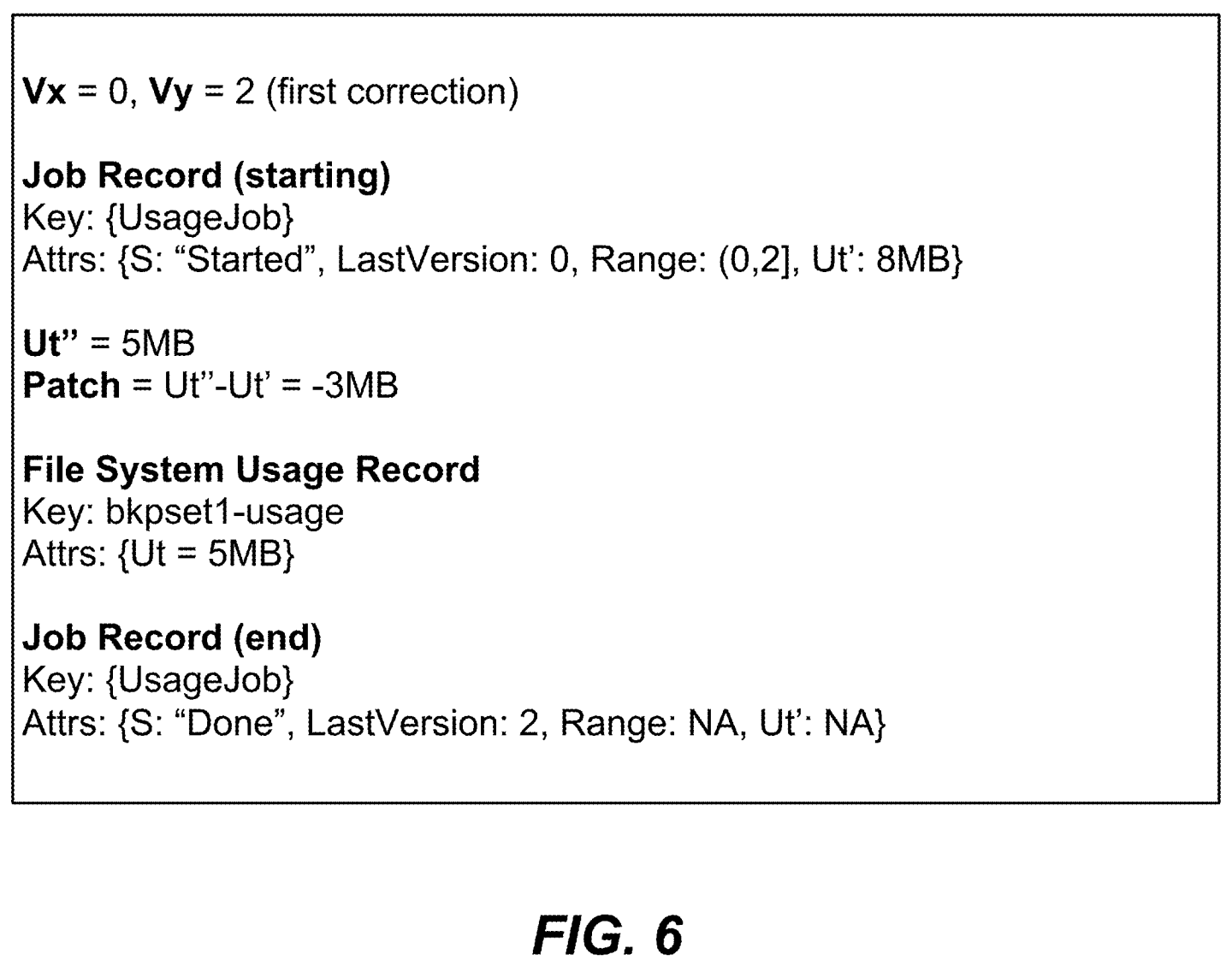

Vx = 0, Vy = 2 (first correction)

Job Record (starting)
Key: {UsageJob}
Attrs: {S: "Started", LastVersion: 0, Range: (0,2], Ut': 8MB}

Ut'' = 5MB
Patch = Ut''-Ut' = -3MB

File System Usage Record
Key: bkpset1-usage
Attrs: {Ut = 5MB}

Job Record (end)
Key: {UsageJob}
Attrs: {S: "Done", LastVersion: 2, Range: NA, Ut': NA}

*FIG. 6*

USAGE CORRECTION IN A FILE SYSTEM

CROSS REFERENCE TO RELATED APPLICATIONS

This application is a continuation of U.S. application Ser. No. 18/095,953, filed on Jan. 11, 2023, which claims the benefit of Indian Provisional Application No. 202241002128, filed on Jan. 13, 2022, which are incorporated by reference herein for all purposes.

TECHNICAL FIELD

The disclosed embodiments are related to data management systems, and, more specifically, to performing correction operations for the usage metadata of a file system.

BACKGROUND

To protect against data loss, organizations may periodically back up data to a backup system and restore data from the backup system. A data management provider may provide backup services to various organizations. The data management provider may handle a large number of backup requests that involve a tremendous amount of data. While data management providers conventionally attempt to keep track of the data using various metadata, errors can easily occur during various processes due to interruptions and failures in various situations.

SUMMARY

In some embodiments, a computer-implemented method for usage correction for a file system is described. A data management system may maintain a total-size counter for the file system. The total-size counter represents a sum of data size related to snapshots backed up to the file system. The data management system may perform data operation cycles to the file system. Each data operation cycle corresponds to a snapshot that includes files. Each data operation cycle may include incrementing the total-size counter by the data size of the files in the snapshot exchanged with the file system and adding, to a snapshot record, the amount of increment in incrementing the total-size counter as an increment-size counter. A data management system may perform a correction operation to correct the total-size counter. The correction operation changes the total-size counter by a difference between the total of the increment-size counters stored in a plurality of snapshot records and the total data size of file data that are exchanged with the file system.

BRIEF DESCRIPTION OF THE DRAWINGS

FIG. 3 below provides an example process of correcting a total-size counter, in accordance with some embodiments.

FIG. 4 is a flowchart depicting an example process for illustrating a correction operation, in accordance with some embodiments.

FIG. 5A is a conceptual diagram illustrating the metadata in a data operation cycle that proceeds normally.

FIG. 5B is a conceptual diagram illustrating the metadata in a data operation cycle that encounters a technical issue.

FIG. 6 is a conceptual diagram illustrating the correction of metadata in a correction operation, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One skilled in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example System Environment

Figure 1:
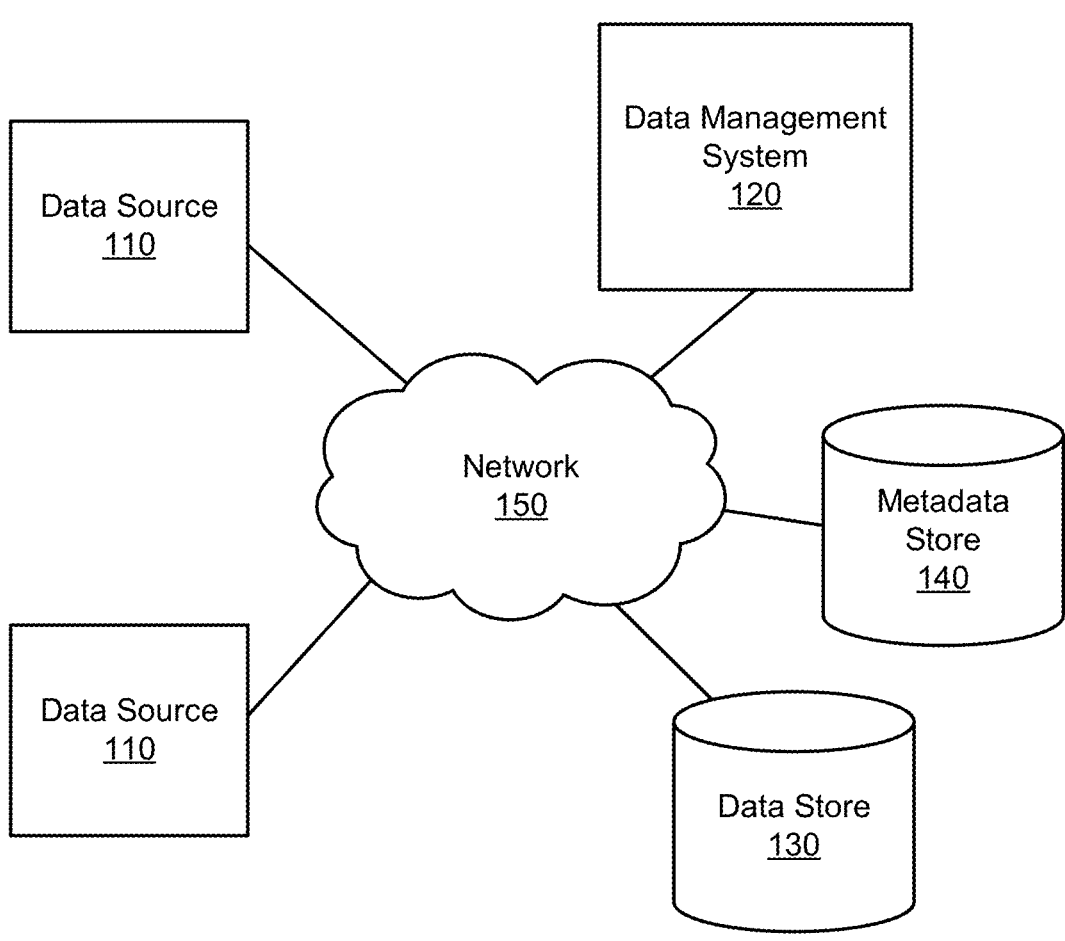
FIG. 1 is a block diagram illustrating an example system environment, in accordance with some embodiments.

FIG. 1 is a block diagram illustrating a system environment 100 of an example data management system that may be used for usage correction of a file system, in accordance with some embodiments. By way of example, the system environment 100 may include one or more data sources 110, a data management system 120, a data store 130, a metadata store 140, and a network 150. In various embodiments, the system environment 100 may include fewer and additional components that are not shown in FIG. 1.

The various components in the system environment 100 may each correspond to a separate and independent entity or some of the components may be controlled by the same entity. For example, in some embodiments, the data management system 120 and the data store 130 may be controlled and operated by the same data storage provider company while the data source 110 may be controlled by an individual client. In another embodiment, the data management system 120 and the data store 130 may be controlled by separate entities. For example, the data management system 120 may be an entity that utilizes various popular cloud data service providers that operate the data stores 130. The components in the system environment 100 may communicate through the network 150. In some cases, some of the components in the environment 100 may also communicate through local connections. For example, the data management system 120 and the data store 130 may communicate locally as local servers, or may communicate remotely in the state-of-the-art Cloud storage environment.

A data source 110 may be one or more computing devices whose data will need to be backed up. The data source 110 can be a client device, a client server, a client database, a virtual machine, a local backup device (e.g., NAS) or another suitable device that has data to be backed up. In some embodiments, the data source 110 may send a request to store, read, search, delete, modify, and/or restore data stored in the data store 130. Data from a data source 110 may be captured as one or more snapshots. Individual file blocks of the data in those snapshots may be stored in the data store 130. A client that uses the data source 110 to perform such operations may be referred to as a user or an end user of the data management system 120. The data source 110 also may be referred to as a user device, an end user device, a virtual machine, and/or a primary source, depending on the type of data source. In the system environment 100, there can be different types of data sources. For example, one data source 110 may be a laptop of an enterprise employee whose data are regularly captured as backup snapshots. Another data source 110 may be a virtual machine. Yet another data source 110 may be a server in an organization.

The data sources 110 may involve any kinds of computing devices. Examples of such computing devices include personal computers (PC), desktop computers, laptop computers, tablets (e.g., APPLE IPADs), smartphones, wearable electronic devices such as smartwatches, or any other suitable electronic devices. The data backup clients may be of different natures such as including individual end users, organizations, businesses, and other clients that use different types of client devices (e.g., target devices) that run on different operating systems. The data source 110 may take the form of software, hardware, or a combination thereof (e.g., some or all of the components of a computing machine of FIG. 7).

The data management system 120 may manage data operation cycles (e.g., data backup cycles and restoration cycles) between the data source 110 and the data store 130 and manage metadata of file systems in the data store 130, including making corrections to the usage metadata of the data store 130. In some embodiments, an operator of the data management system 120 may provide software platforms (e.g., online platforms), software applications that will be installed in the data source 110 (e.g., a background backup application software), application programming interfaces (APIs) for clients to manage backup and restoration of data, etc. In some embodiments, the data management system 120 manages backup data that is stored in the data store 130. For example, the data management system 120 may coordinate the upload and download of backup data between a data source 110 and the data store 130. In this disclosure, data management system 120 may collectively and singularly be referred to as a data management system 120, even though the data management system 120 may include more than one computing device. For example, the data management system 120 may be a pool of computing devices that may be located at the same geographical location (e.g., a server room) or distributed geographically (e.g., cloud computing, distributed computing, or in a virtual server network).

The data management system 120 may capture a snapshot of a data source 110 and upload data files in the snapshot to the data store 130 in a data operation cycle. The data operation cycle may include creation of various versioning and other metadata related to a file system, the snapshots and the files involved in the data operation cycle. Details of the metadata creation and management will be further discussed in FIG. 2 through FIG. 6.

A snapshot may be a set of copies of files that reflect the state of the data source 110 and/or the state of the data source 110 at the capture time (e.g., during a checkpoint). A snapshot, in one example, may be an image of the storage (or a portion of the storage) of a data source 110 that is captured at a particular moment in time. The moment in time may be referred to as a checkpoint. A snapshot may be a complete image or an incremental image. For example, an initial backup of a device may generate a snapshot that captures a complete image of a set of files in the data source 110. Subsequent checkpoints may generate snapshots of incremental images that represent the differential changes of the data source 110.

In some embodiments, a snapshot may be divided into data blocks that are saved in various different locations in the data store 130. A data block may be a set of bits that represent data of a file or multiple files. Files may be of various sizes compared to a data block. For example, a large file may include multiple data blocks while a single data block may contain data from a combination of various small files. In some examples of this disclosure, 1 MB data blocks are used as examples, but data blocks of other sizes may also be used. Data of a file may be retrieved by the identifiers of data blocks (e.g., an external file address, data blocks' addresses, fingerprints, etc.) and offsets of the starting and ending data blocks. Various individual data blocks of a snapshot may be stored in different locations of a data store 130 and sometimes may not be grouped. In some data stores 130, a data block may be started in a random location based on the checksum or another identifiable fingerprint of the data block (or the object containing the data block) as the address or identifier of the data block. Some data stores 130 use files as units to save the data instead of dividing files as data blocks that are fixed in length.

A data operation cycle, such as a backup cycle, may be triggered by an action performed at a data source 110 or by an event, may be scheduled as a regular cycle, or may be in response to an automated task initiated by the data management system 120 to a data source 110. In some embodiments, the data management system 120 may poll a data source 110 periodically and receive files to be backed up and corresponding metadata, such as file names, data sizes, access timestamps, access control information, and the like. In some embodiments, the data management system 120 may perform incremental data operation cycles (e.g., incremental backups) that leverage data from previous data operation cycles to reduce the amount of data to store. The data management system 120 may store the files of the client device as data blocks in the data store 130.

A data operation cycle, such as a backup cycle, may also include de-duplication. A de-duplication operation may include determining a fingerprint of a data block in the snapshot. For example, the fingerprint may be the checksum or a hash of the data block. The data management system 120 may determine that the file system has already stored a data block that has the same fingerprint. In response, the data management system 120 may de-duplicate the data block by not uploading the data block again to the data store 130. Instead, the data management system 120 may create a metadata entry that links the file that includes the duplicated block in the snapshot to the data block that exists in the data store 130. If the data management system 120 determines that the data block's fingerprint is new, the data management system 120 will cause the upload of the data block to the data store 130.

The data management system 120 may also perform other data operation cycles such as compaction cycles. For example, only certain versions of snapshots may still be active and data in older versions of snapshots are retired or achieved. The data management system 120 may scan for files that are deleted in an older version of the snapshot that is no longer active in a compaction operation.

Figure 7:
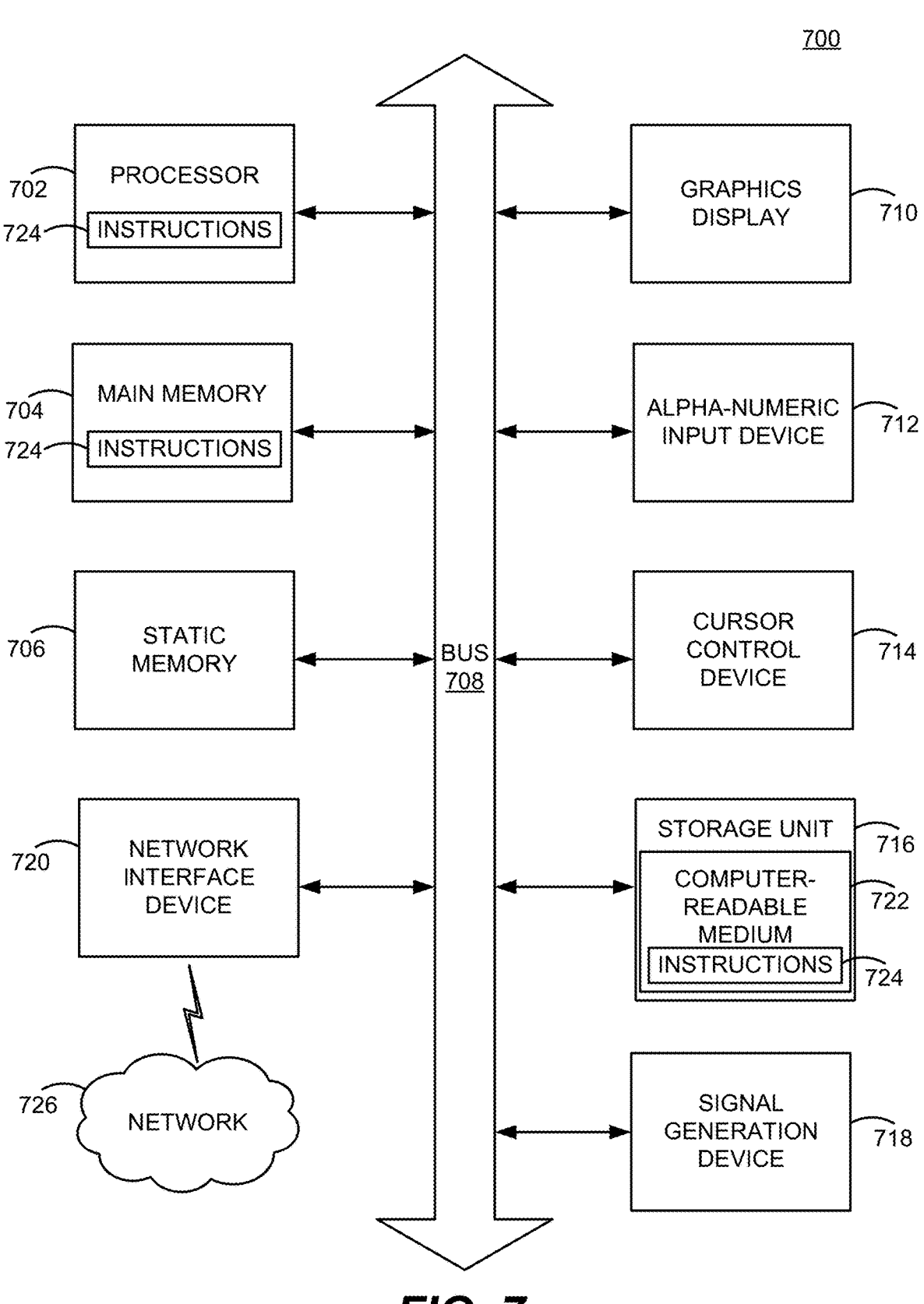
FIG. 7 is a block diagram illustrating components of an example computing machine, in accordance with some embodiments.

In some embodiments, a computing device of the data management system 120 may take the form of software, hardware, or a combination thereof (e.g., some or all of the components of a computing machine of FIG. 7). For example, parts of the data management system 120 may be a PC, a tablet PC, a smartphone, an internet of things (IoT) appliance, or any machine capable of executing instructions that specify actions to be taken by that machine. Parts of the data management system 120 may include one or more processing units and memory.

The data store 130 may communicate with a data source 110 via the network 150 for capturing and restoring snapshots and/or files of the data source 110. The data store 130 may also work with the data management system 120 to cooperatively perform data management of data related to the data source 110. The data store 130 may include one or more storage units such as memory that may take the form of non-transitory and non-volatile computer storage medium to store various data. In some embodiments, the data store 130 may also be referred to as a cloud storage server. Examples of cloud storage service providers may include AMAZON AWS, DROPBOX, RACKSPACE CLOUD FILES, AZURE BLOB STORAGE, GOOGLE CLOUD STORAGE, etc. In other cases, instead of cloud storage servers, the data store 130 may be a storage device that is controlled and connected to the data management system 120. For example, the data store 130 may be memory (e.g., hard drives, flash memory, discs, tapes, etc.) used by the data management system 120.

The data store 130 may include one or more file systems that store various data (e.g., files and/or snapshots of data sources 110 in various backups) in one or more suitable formats. For example, the data store 130 may use different data storage architectures to manage and arrange the data. A file system defines how an individual computer or system organizes its data, where the computer stores the data, and how the computer monitors where each file is located. A file system may include directories and/or addresses. In some embodiments, the file system may take the form of an object storage system and manage data as objects. In some embodiments, the file system may manage data as blocks within sectors and tracks. With block storage, files are split into blocks (evenly sized or not) of data, each with its own address. Block storage may be used for most applications, including file storage, snapshot storage, database storage, virtual machine file system (VMFS) volumes, etc. In the context of backup, the file system may also be referred to as a backup file system. While in this disclosure backup operations and cycles and used as primary examples of data operations, the file system and the correction scheme discussed herein may also be used for other data operations that change the size of the file system.

The metadata store 140 may include metadata for the data store 130 in various levels, such as file system level, snapshot level, file level, and block level. Metadata is data that describes data (whether at file system level, snapshot level, and/or file level). Examples of metadata include timestamps, version identifiers, file directories including timestamps of edit or access dates, add and carry logical (ACL) checksums, journals including timestamps for change event, create version, modify version, compaction version, and delete version.

Metadata in the metadata store 140 may include a file system usage record, snapshot records, and data records. The file system usage record may include metadata such as a total-size counter, $U_f$, for the data store 130. The total-size counter may represent the sum of the data size in the file system. The file system usage record may include usage statistics that are stored in a database (e.g., a NoSQL) since this type of database may provide the functionality to atomically increment integer attributes. The snapshot records may include metadata of the snapshots, such as timestamps when the snapshots are captured, backup set identifiers, and increment-size counters that each represents the increase in the data size that is measured through a data operation cycle. The data records may include metadata that describes information about the files. For example, the data records may include file block map records. Further details on each type of metadata will be discussed in FIG. 2.

While the data store 130 and the metadata store 140 are illustrated as separate components in FIG. 1, in some embodiments, the data store 130 and the metadata store 140 may be operated as the same storage. For example, in some embodiments, the data store 130 may include a file system and the metadata store 140 together as a single data store. In other embodiments, the data store 130 and the metadata store 140 are separate.

The communications among the data source 110, the data management system 120, the data store 130, metadata store 140 may be transmitted via a network 150, for example, via the Internet. The network 150 provides connections to the components of the system 100 through one or more sub-networks, which may include any combination of local area and/or wide area networks, using both wired and/or wireless communication systems. In some embodiments, a network 150 uses standard communications technologies and/or protocols. For example, a network 150 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 150 may be represented using any suitable format, such as hypertext markup language (HTML), extensible markup language (XML), or JSON. In some embodiments, all or some of the communication links of a network 150 may be encrypted using any suitable technique or techniques such as secure sockets layer (SSL), transport layer security (TLS), virtual private networks (VPNs), Internet Protocol security (IPsec), etc. The network 150 also includes links and packet switching networks such as the Internet.

Example File System and Metadata Structure

Figure 2:
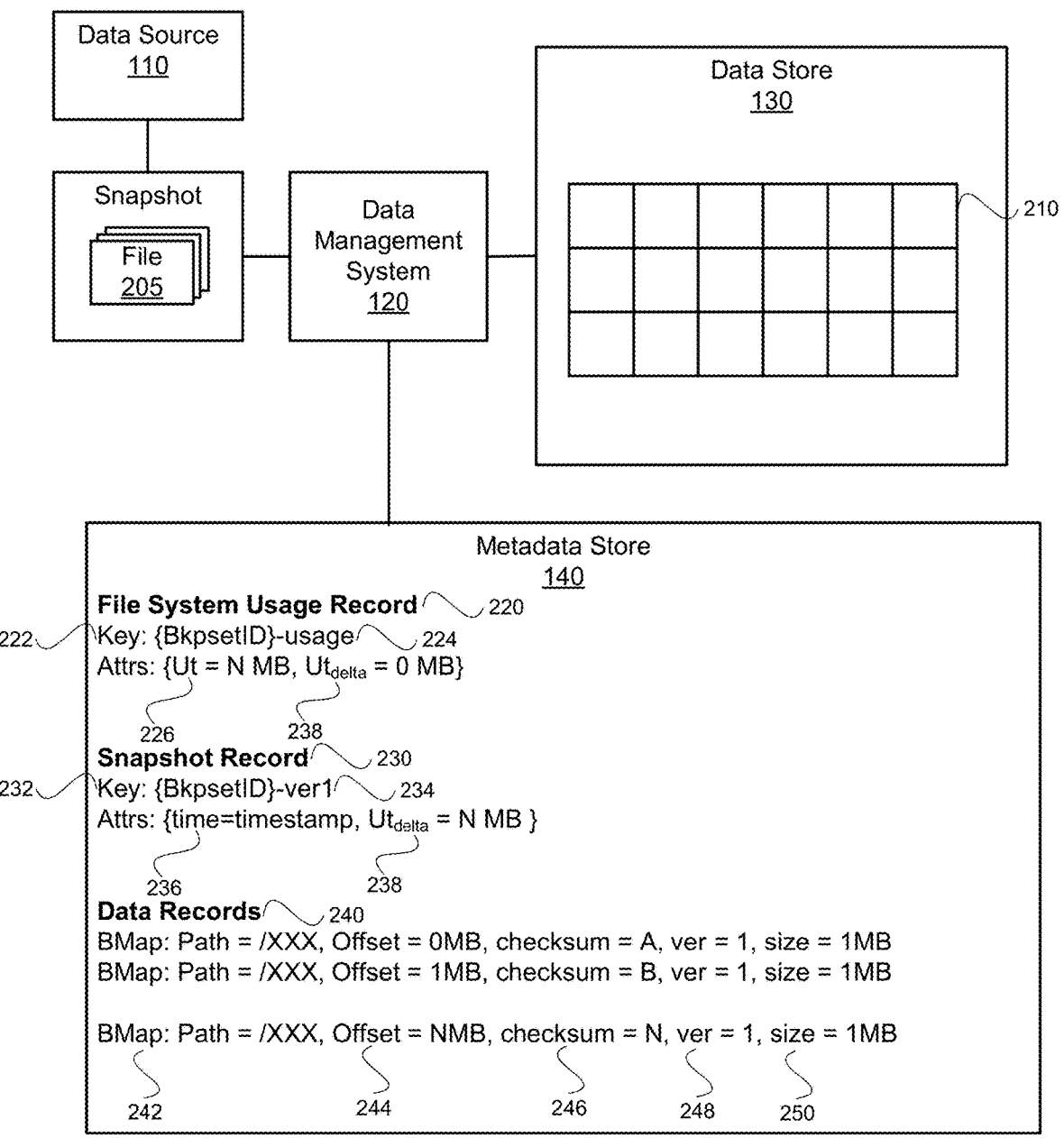
FIG. 2 is a block diagram that illustrates an example architecture of a file system and the corresponding metadata store, in accordance with some embodiments.

FIG. 2 is a block diagram that illustrates an example architecture of a data store 130 and the corresponding metadata store 140, in accordance with some embodiments. The data store 130 may include a file system that is used to store the underlying data of backup uploaded from various data sources 110. The metadata store 140 may be used to store the attributes of those underlying data and related snapshots as metadata. The architecture illustrated in FIG. 2 is only an example. In various embodiments, the metadata stored in the metadata store 140 may include fewer, additional, or different metadata fields.

The data store 130 may store files 205 in data blocks, fixed length or not. While data block usage is illustrated as an example architecture of the data store 130, other architectures may also be used for various embodiments. When a data source 110 uploads a snapshot of files 205, the data management system 120 may divide or combine the files 205 into data blocks 210. For example, a data block 210 may contain 1 MB of data. If a file 205 is larger than 1 MB, the file is divided into multiple data blocks 210. Multiple smaller files 205 may be combined into a data block with each file 205 beginning and ending at particular offsets. The data management system 120 may perform a deduplication operation for the data blocks 210. The non-duplicated data blocks 210 are uploaded to the data store 130 at specific addresses. Corresponding metadata is also created to store the attributes of those uploaded files and their corresponding data blocks 210.

The metadata that are stored in the metadata store 140 may represent attributes of the data store 130 in various levels, from the highest file system level, snapshot level, to the lowest data level. In some embodiments, the metadata may be divided into three or more types of records, including a file system usage record 220, a number of snapshot records 230, and a number of data records 240.

The file system usage record 220 includes metadata regarding usage records of a file system in the data store 130. The file system usage record 220 may take the form of key-value pairs that reflect the usage of the file system when a new snapshot is backed up. The key 222 may be a backup set identifier 224 that identifies the particular data source 110 for which the backup operation is taking place. The values include attributes of the data store 130 after the particular data operation cycle. For example, the attributes include the total-size counter 226, which may be denoted as $U_t$, and an increment-size counter 238, $Ut_{delta}$. Additional attributes may also be included.

The total-size counter 226 the sum of data size in the data store 130, such as the sum of all data blocks 210 stored in the file system across various snapshots. The total-size counter 226 may be one of the major counters which are maintained for a file system. In some embodiments, the total-size counter 226 represents the size prior to deduplication. As such, in some embodiments, the total-size counter 226 is not determined by directly calculating the size of the data in the file system because, in some cases, the file system is de-duplicated.

In some embodiments, the data management system 120 determines the value of total-size counter 226 by incrementing the total-size counter 226 in each data operation cycle. However, as discussed in further detail below, some data operation cycles may be interrupted and steps may be repeated. Such repetition could result in the data management system 120 re-executing some steps and incrementing the total-size counter 226 again, thus resulting in an inaccurate value of the total-size counter 226. For example, in the context of Cloud storage, the steps in a data operation cycle may be carried by a series of API calls from the data management system 120 to the data store 130. At each API call that transfers part of the files in the snapshot to the data store 130, the data management system 120 may increment the total-size counter 226. However, in some situations, one or more API calls may fail or may be interrupted. The data management system 120 may increment the total-size counter 226 while the data transfer fails. When a new API call is initiated to attempt the data transfer fails, the data management system 120 may increment the total-size counter 226 again, resulting in an inaccurate value of the total-size counter 226. FIG. 3 below provides an example process of correcting the total-size counter 226. While Cloud storage using API calls is used as an example of explaining potential interruption issues in a data operation cycle, the backup architecture is not limited to Cloud storage because interruptions and failures can occur in many settings. Also, other than backup cycles, various counter values may also have an inaccurate value due to interruptions in other flows apart from backup.

The increment-size counter 238 is another attribute that monitors the amount of increment in the total-size counter 226 in a data operation cycle. The increment-size counter 238 reflects the data size of the files in the snapshot exchanged with the file system as measured through the data operation cycle. While in many situations the exchange with the file system is a transmission of data to the file system, there are also possibilities such as compaction that removes data from the file system and may result in a reduction in total-size counter 226 and a negative increment-size counter 238. As such, incrementation can be positive or negative, depending on situations. Similar to the total-size counter 226, some steps in the data operation cycle may fail or be interrupted. As such, the increment-size counter 238 may also be an inaccurate number.

As discussed in further detail below, the value of increment-size counter 238 stored in the file system usage record 220 may be temporary. The increment-size counter 238 may be reset to zero when a data operation cycle is completed. For example, the increment-size counter 238 may be reset to zero after all backup operations for a snapshot is complete.

The snapshot records 230 are entries that each documents various attributes related to a particular snapshot. The snapshot records 230 may take the form of key-value pairs that separate the entries by snapshots and reflect the attributes of each snapshot. A new snapshot record 230 is created in a data operation cycle (e.g., at the end of the data operation cycle after all data operations are done) to document the attributes of the snapshot being backed up in the particular data operation cycle. The key 232 may be a backup set identifier 234 that identifies a particular snapshot for a backup set of a data source 110. The values include attributes of the particular data operation cycle. For example, the attributes may include a timestamp 236 that documents the time of completion of the data operation cycle. The attributes may also include the increment-size counter 238 that is copied from the file system usage record 220. In some embodiments, the data management system 120 performs various API calls to carry out the steps in the data operation cycle. The data management system 120 increments the total-size counter 226 and the increment-size counter 238 as the steps are performed. After the data management system 120 determines that the data operation cycle is completed, the data management system 120 may create the file system usage record 220 corresponding to the data operation cycle. In some embodiments, at the end of the backup cycle, the data management system 120 copies the value of the increment-size counter 238 from the file system usage record 220 to the newly created snapshot record 230 and resets the value of the increment-size counter 238 in the file system usage record 220 to zero.

The data records 240 includes attributes of the file data that are stored in the file system of the data store 130. In some embodiments, the data records 240 may also be referred to as file block map records. The file data may be from any one of the snapshots. In some embodiments, the backup architecture uses a versioning file system. In some embodiments, the files 205 are not directly saved in the data store 130. Instead, data blocks 210 are saved and metadata related to the creation, versioning, modification, compaction, and deletion of the data blocks 210 are saved as the data records 240. By way of example, an entry of data record 240 may include a block map attribute 242 that points to the file corresponding to the data block. The data record 240 may also include an offset attribute 244, a fingerprint attribute 246 such as a checksum of the data block, a versioning attribute 248, and a size attribute 250.

Example Usage Metadata Correction Process

FIG. 3 is a flowchart depicting an example process 300 for usage correction for the data store 130, in accordance with some embodiments. The process 300 may be performed by the data management system 120 in cooperation with the metadata store 140. The process 300 may be embodied as a software algorithm that may be stored as computer instructions that are executable by one or more processors. The instructions, when executed by the processors, cause the processors to perform various steps in the process 300.

In some embodiments, the data management system 120 may maintain 310 a total-size counter 226 for the data store 130. The total-size counter may represent a sum of data size in a file system of the data store 130. The total-size counter 226 may be saved as part of the file system usage record 220 in the metadata store 140. In some embodiments, the total-size counter 226 may measure the data size before de-duplication. The total-size counter 226 may be generated by incrementing the value of the total-size counter 226 in various data operation cycles. The total-size counter 226 may also be reduced. For example, in a compaction operation, a data block may be identified to be deleted or garbage collected. The corresponding size of the block is subtracted from the total-size counter 226.

Various data operation cycles may have different technical issues that affect the accuracy of the total-size counter 226. The data management system 120 may correct the total-size counter 226 in a correction operation as discussed in a subsequent step.

In some embodiments, the data management system 120 may perform 320 a plurality of data operation cycles to the data store 130. One or more data operation cycles may each correspond to a snapshot that includes different files, while other data operation cycles may include operations such as compaction. In some embodiments, the data store 130 may be constructed under a Cloud storage system operated by a third party such as AMAZON AWS, MICROSOFT AZURE, etc. The metadata store 140 may also be another Cloud storage system such as the same or a different system as the data store 130. In some embodiments, a data operation cycle (e.g., a backup operation) may include a series of backup operations that involve API calls to the data store 130 or to the metadata store 140 to upload the file data to the data store 130 and create metadata entries to the metadata store 140.

By way of example, a data operation cycle corresponding to a snapshot (e.g., backing up a snapshot) may include transmitting 322 file data in the snapshot to the data store 130. In the Cloud storage setting, the transmission 322 of file data to the data store 130 may be performed by an API call. The transmission 322 may also be referred to as a data operation, or in the case of a backup cycle, a backup operation. The data operation cycle may also include creating 324 data records 240 for the data blocks or files in the snapshot. For example, each data record 240 may correspond to a data block or a file, depending on the structure of the data record 240. Each data record 240 may include metadata of the file, such as metadata of the data blocks in the file. The metadata in the data record 240 may include information regarding a data size, such as the size attribute 252.

The data operation cycle may include incrementing 326 the total-size counter 226 by the data size of the files in the snapshot exchanged with the data store 130. The amount of increment may be measured through the data operation cycle. For example, when the data management system 120 makes an API call to upload file data to the data store 130 as part of the data operation cycle, the data management system 120 may increment the total-size counter 226 based on the data size corresponding to the API call.

The data operation cycle may include creating 328 a snapshot record 230 corresponding to the snapshot. In some embodiments, the creation 328 of a snapshot record 230 is performed at the completion of the backup cycle. The data operation cycle may include change 330, to the snapshot record, the amount of increment in incrementing the total-size counter as an increment-size counter 238 as part of the snapshot record 230. In some embodiments, the steps 328 and 330 may occur once per data operation cycle. For example, after all data operations are completed, the data management system 120 may create 328 the snapshot record 230 and change 330 the amount of increment. In a backup cycle, the changing 330 of the amount of increment is likely to be adding. However, in other types of data operation cycles such as compaction, the changing 330 could be adding or subtracting.

The various steps 322 through 330 in a data operation cycle may be performed in the sequence illustrated in FIG. 3 or another sequence. In some embodiments, those steps may be performed without transaction. A database transaction is a special type of operation that has certain characteristics such as being atomic such as all steps are to be completed in their entirety or none of the steps will have any effect at all. The steps 322 through 326 may be performed multiple times for each data operation cycle. For example, the transmission of file data may occur in multiple steps 322 such as multiple API calls. Since the steps 322 through 330 are not performed in transaction, one or more steps may have to be repeated due to interruption or failure.

In some embodiments, the data management system 120 may perform 340 a correction operation to correct the total-size counter 226 for the data store 130 for a plurality of data operation cycles, such as in a batch. The correction operation may change the total-size counter by a difference between (a) the total of the increment-size counters stored in a plurality of snapshot records corresponding to the plurality of data operation cycles and (b) the total data size of file data that are exchanged with the file system in the plurality of data operation cycles.

FIG. 4 is a flowchart depicting an example process 400 for illustrating a correction operation 340, in accordance with some embodiments. The process 400 may be performed by the data management system 120 in cooperation with the metadata store 140. The process 400 may be embodied as a software algorithm that may be stored as computer instructions that are executable by one or more processors. The instructions, when executed by the processors, cause the processors to perform various steps in the process 400.

In a correction operation, the data management system 120 determine the total of the increment-size counters stored in a plurality of snapshot records included in the correction operation. The data management system 120 may define 410 a range of snapshots that are to be included in the correction operation. For example, the correction operation may be performed periodically. The data management system 120 may determine the snapshots that are backed up since the last correction operation. The data management system 120 may retrieve 420 the snapshot records 230 corresponding to the snapshots in the range. The data management system 120 may sum 430 the increment-size counters of the snapshot records as the total of the increment-size counters.

In a correction operation, the data management system 120 determines the total data size of file data that are exchanged with the file system in the plurality of data operation cycles corresponding to those snapshots within the range. For example, the data management system 120 may examine 440 metadata of the data records 240 that identify files that are exchanged with the data store 130 in the plurality of data operation cycles. The data management system 120 may retrieve 450 the data size, such as the size attribute 252, in each of the data records 240 for the identified files that are exchanged with the data store 130 in the plurality of data operation cycles performed in the plurality of the snapshots included in the correction operation. The data management system 120 may add 460 the data sizes to determine the total data size.

The data management system 120 may determine 470 the difference between (a) the total of the increment-size counters 238 stored in the plurality of snapshot records 230 fall within the range of the correction operation and (b) the total data size of file data that are exchanged with the data store 130 in those snapshot records 230. The data management system 120 may apply 480 the difference to the total-size counter 226 to correct the value of the total-size counter 226.

Illustrative Examples

FIG. 5A through FIG. 6 provide illustrative examples for the change in metadata in data operation cycles and correction operations using illustrative numbers, in accordance with some embodiment.

In a data operation cycle, the data management system 120 identifies the files and blocks to be exchanged with the data store 130. A few hundred blocks are clubbed together in a batch and sent to the backup API for probing of checksums. Blocks which are not already present in the filesystem are uploaded to the data store 130. For each block, following in-memory operations may be performed: a block-Map (BMap) metadata record is created and the Ut counter is increased by the block size. At the end of the backup API, Ut is incremented in the file history record. Metadata records are flushed to the metadata store 140. Backup commit happens when all the files and blocks are backed up, at that time a snapshot record is created in the metadata store 140.

FIG. 5A is a conceptual diagram illustrating the metadata in two backup cycles that proceed normally. A file1.txt of size 2 MB (two data blocks) is getting backed up in version 1. The file system usage record 220 is updated to increment both the total-size counter 226 and increment-size counter 238 by 2 MB. A snapshot record 230 is created and the increment-size counter 238 is copied to the snapshot record 230. Two file records 240 are created to reflect the attributes of the two data blocks. In second version a file2.txt of size 3 MB is backed up. The total-size counter 226 and the increment-size counter 238 are incremented by 3 MB.238238In some embodiments, after the data operation cycle, the data management system 120 may reset the increment-size counter 238 in the file system usage record 220 to zero in response to the increment-size counter 238 being copied to the snapshot record 230.

FIG. 5B is a conceptual diagram illustrating the metadata in a data operation cycle that encounters a technical issue. In the data operation cycle, the update of the file system usage record 220, the transmission of file data, and creation of the snapshot record 230 and the data records 240 are not performed in transaction in some embodiments. A distributed system usually undergoes retries to overcome failures such as the dropping of network connections or interruptions in instance nodes. Retries on such failures without transaction can bring inconsistency in the metadata.

Consider the previous example illustrated in FIG. 5A but this time an interruption happened between file system usage record update and metadata flush. Later the data management system 120 retries the backup API for second backup. The repetition of backup API may result in the total-size counter 226 and increment-size counter 238 being incremented twice. As such, the total-size counter 226 and increment-size counter 238 in FIG. 5B both show 8 MB. However, in data records 240, since only three data blocks are uploaded, the data records 240 only show 5 MB (the sum of all size attributes 250). Even if the data blocks are attempted to be uploaded more than one time, the data blocks may only exist once because of deduplication.

The data management system 120 may not perform the steps in a data operation cycle in transactions for various reasons. For example, there can be cost implications. Taking a transaction between updating the file system usage record 220 and thousands or millions of metadata records can incur a large cost (a typical snapshot can include millions of data blocks). Also, Cloud storage system (e.g., AWS DynamoDB) and other types of data stores 130 often charge almost double for the same amount of data if write operations are performed in a transaction.

There can also be performance reasons. For example, if the underlying record on which the transaction is taking place is modified by another parallel operation, conflicts may arise. In various embodiments, the data management system 120 may be handling data operation cycles of many organization clients. Each client may operate multiple devices such as laptops from different employees. In some embodiments, two or more of the data operation cycles are performed in parallel in time. Retries are needed until conflicts are resolved. Additional time spent in these retries can adversely affect the performance of a system where multiple backup APIs are often issued simultaneously.

In some cases, transactions might not even be supported by a file system. For example, some Cloud storage systems that may serve as a data store 130 or a metadata store 140 may not support transactions.

Since an issue in a data operation cycle can create discrepancies in metadata and an inaccurate value of the total-size counter 226, a correction operation is needed to recalculate the total-size counter 226. However, simply iterating over metadata records would not work as filesystem state is constantly changing due to ongoing backups and compactions. In some embodiments, a correction operation that asynchronously corrects the anomalies is used.

In the file system usage record level, a new counter increment-size counter 238, $Ut_{delta}$, is stored along with total-size counter 226, Ut. During a backup API, both counters are incremented by the same amount. Since total-size counter 226 and increment-size counter 238 are part of the same metadata record, no extra I/O cost is incurred for this operation. At the end (commit) of the backup, the increment-size counter 238 may be transferred from the file system usage record 220 to the snapshot record 230. After the snapshot record 230 is pushed to the metadata store 140, the increment-size counter 238 in the snapshot record 230 may become fixed and cannot be modified. The increment-size counter 238 in the file system usage record 220 is reset to zero for accumulation of delta for the next data operation cycle.

A periodic correction operation may be performed (e.g., weekly) along with other operations such as compaction. FIG. 6 is a conceptual diagram illustrating the correction of metadata in a correction operation, in accordance with some embodiments. In the correction operation, a job record in the metadata store 140 may be created which contains following attributes:

Status: "Started"

LastVersion: Latest backup version last time when the correction operation was run. Vx VersionRange: A range, (Vx, Vy], for the correction operation. Vy is the current latest backup version. Vx is excluded and Vy is included.

The data management system 120 may calculate the sum of the increment-size counters 238 added by the various data operation cycles in the range of the correction operation. The data management system 120 may fetch the snapshot records 230 from the metadata store 140 where the snapshot record's version lies between (Vx, Vy]. The data management system 120 may add the increment-size counters 238 from each of the snapshot records to calculate the total, Ut'. The data management system 120 may store Ut' in the job record so that this step does not need to be repeated in case of interruptions.

The data management system 120 may calculate the total file data size of the snapshots that fall within the range of the correction operation. In some embodiments, the data management system 120 may iterate over the data records 240 in the metadata store 140. The data management system 120 may identify those data records 240 whose creation version lies in range (Vx, Vy]. The sizes of those data records 240 are added to the total file data size counter Ut".

Ut"-Ut' represents the discrepancy occurred during the backup. The data management system 120 may perform various correction steps, including applying the difference to the total-size counter 226 in the file system usage record 220, updating job status record with "Done", and changing LastVersion Vy. Next correction job would run for snapshot versions greater than Vy. In some embodiments, these steps may be performed in a transaction. Transaction would ensure that difference is not applied twice in case of failures.

The correction operation disclosed have various characteristics that make the correction operation fault-tolerant and immune to race conditions. For example, Ut and Ut$_{delta}$ are generated first as part of the same file history record. This guarantees that both Ut and Ut$_{delta}$ would have the same discrepancy (if any). In some embodiments, snapshot records 230 are not changed once committed. This ensures a stable view of the data store 130, even if any interruption happens during the job. In some embodiments, data records 240 of only committed backups are considered. The correction operation runs along with compaction which ensures that there is no read-write race during iteration of data records. The next correction operation only considers new records formed since the last time.

In some embodiments, since millions of data blocks can be present for large files, intermediate checkpointing may be performed. In regular intervals (e.g., after every few hundred records), the data management system 120 may store an attribute LastBMapRead, which represents the last BMap read from the database {Path, Offset, Size} and AccumulatedUt', which represents the current Ut'. If the job interrupts in the middle, the data management system 120 may restart the previous job record when it is read and the process is continued from the same point without losing calculations done.

Computing Machine Architecture

FIG. 7 is a block diagram illustrating components of an example computing machine that is capable of reading instructions from a computer readable medium and execute them in a processor. A computer described herein may include a single computing machine shown in FIG. 7, a virtual machine, a distributed computing system that includes multiples nodes of computing machines shown in FIG. 7, or any other suitable arrangement of computing devices.

By way of example, FIG. 7 shows a diagrammatic representation of a computing machine in the example form of a computer system 700 within which instructions 724 (e.g., software, program code, or machine code), which may be stored in a computer readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 7 may correspond to any software, hardware, or combined components shown in FIGS. 1-6, including but not limited to, the data source 110, the data management system 120, the data store 130, the metadata store 140 and various engines, interfaces, terminals, and machines shown in FIGS. 1-6. While FIG. 7 shows various hardware and software elements, each of the components described in FIGS. 1-6 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 724 that specify actions to be taken by that machine. Further, while only a single machine is illustrated, the term "machine" and "computer" also may be taken to include any collection of machines that individually or jointly execute instructions 724 to perform any one or more of the methodologies discussed herein.

The example computer system 700 includes one or more processors 702 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 700 also may include memory 704 that store computer code including instructions 724 that may cause the processors 702 to perform certain actions when the instructions are executed, directly or indirectly by the processors 702. Memory 704 may be any storage devices including non-volatile memory, hard drives, and other suitable storage devices. Instructions can be any directions, commands, or orders that may be stored in different forms, such as equipment-readable instructions, programming instructions including source code, and other communication signals and orders. Instructions may be used in a general sense and are not limited to machine-readable codes.

One and more methods described herein improve the operation speed of the processors 702 and reduces the space required for the memory 704. For example, the architecture and methods described herein reduce the complexity of the computation of the processors 702 by applying one or more novel techniques that simplify the steps generating results of the processors 702, and reduce the cost of restoring data. The algorithms described herein also reduce the storage space requirement for memory 704.

The performance of certain of the operations may be distributed among the more than processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. Even though in the specification or the claims may refer some processes to be performed by a processor, this should be construed to include a joint operation of multiple distributed processors.

The computer system 700 may include a main memory 704, and a static memory 706, which are configured to communicate with each other via a bus 708. The computer system 700 may further include a graphics display unit 710 (e.g., a plasma display panel (PDP), a liquid crystal display (LCD), a projector, or a cathode ray tube (CRT)). The graphics display unit 710, controlled by the processors 702, displays a graphical user interface (GUI) to display one or more results and data generated by the processes described herein. The computer system 700 also may include alphanumeric input device 712 (e.g., a keyboard), a cursor control device 714 (e.g., a mouse, a trackball, a joystick, a motion sensor, or other pointing instrument), a storage unit 716 (a hard drive, a solid state drive, a hybrid drive, a memory disk, etc.), a signal generation device 718 (e.g., a speaker), and a network interface device 720, which also are configured to communicate via the bus 708.

The storage unit 716 includes a computer readable medium 722 on which is stored instructions 724 embodying any one or more of the methodologies or functions described herein. The instructions 724 also may reside, completely or at least partially, within the main memory 704 or within the processor 702 (e.g., within a processor's cache memory) during execution thereof by the computer system 700, the main memory 704 and the processor 702 also constituting computer readable media. The instructions 724 may be transmitted or received over a network 726 via the network interface device 720.

While computer readable medium 722 is shown in an example embodiment to be a single medium, the term "computer readable medium" should be taken to include a single medium or multiple media (e.g., a centralized or distributed database, or associated caches and servers) able to store instructions (e.g., instructions 724). The computer readable medium may include any medium that is capable of storing instructions (e.g., instructions 724) for execution by the processors (e.g., processors 702) and that causes the processors to perform any one or more of the methodologies disclosed herein. The computer readable medium may include, but not be limited to, data repositories in the form of solid-state memories, optical media, and magnetic media. The computer readable medium does not include a transitory medium such as a propagating signal or a carrier wave.
Additional Considerations The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method for usage correction for a file system, the computer-implemented method comprising:

maintaining a file-system-level metadata for the file system, the file-system-level metadata representing an overall status in the file system;

performing a plurality of snapshot operations to the file system, wherein a particular snapshot operation has an interruption, the particular snapshot operation comprises:

incrementing the file-system-level metadata based on changes recorded the particular snapshot operation, and recording a snapshot-level metadata that is specific to the particular snapshot operation, wherein the snapshot-level metadata includes an inaccuracy due to the interruption; and performing a correction operation that is asynchronous to the plurality of snapshot operations to correct the overall status in the file system by adjusting the file-system-level metadata, the correction operation is partially based on determining the inaccuracy of the snapshot-level metadata specific to the particular snapshot.

2. The computer-implemented method of claim 1, wherein each snapshot operation comprises creating data records for file data in the snapshot operation, each data record comprising metadata of the file data, the metadata in the data record comprising information regarding a data size, and wherein a total data size of the file data that are exchanged with the file system in the plurality of snapshot operations is determined based on the information the data size included in the metadata in the data records.

3. The computer-implemented method of claim 2, wherein determining the total data size comprises:

examining metadata of the data records that identify files that are exchanged with the file system in the plurality of snapshot operations;

retrieving the data size in each of the data record for the identified files that are exchanged with the file system in the plurality of snapshot operations; and adding the data sizes to determine the total data size.

4. The computer-implemented method of claim 1, wherein the correction operation comprises:

defining a range of snapshots that are to be included in the correction operation, retrieving the snapshot records corresponding to the snapshots in the range, and summing snapshot-level metadata of the snapshot records as a total of the snapshot-level metadata.

5. The computer-implemented method of claim 1, wherein the at least one of the snapshot operations comprises a plurality of data operations that are performed through one or more application programming interface (API) calls.

6. The computer-implemented method of claim 1, wherein the at least one of the snapshot operations is performed without transaction.

7. The computer-implemented method of claim 1, wherein the file-system-level metadata is saved as part of a file system usage record, and the snapshot-level metadata is saved as part of the snapshot record.

8. The computer-implemented method of claim 1, wherein the particular snapshot operations further comprises:

resetting, responsive to the snapshot-level metadata being saved to a snapshot record, the snapshot-level metadata in the file system usage record to zero.

9. The computer-implemented method of claim 1, wherein the inaccuracy comprising an amount of data increment that is measured through the particular snapshot operation being different from an accurate value due to the interruption.

10. The computer-implemented method of claim 1, wherein at least two or more of the snapshot operations are performed in parallel in time.

11. The computer-implemented method of claim 1, wherein the particular snapshot further comprises:

determining a fingerprint of a first data block in the particular snapshot;

determining that the file system has already stored a second data block that has the same fingerprint; and de-duplicating the first data block.

12. The computer-implemented method of claim 1, wherein metadata of the file system comprises the snapshot records, data records, and a file system usage record.

13. A system comprising:

a file system configured to store file data;

a metadata store comprising memory configured to store a file-system-level metadata for the file system, the file-system-level metadata representing an overall status in the file system; and a data management system in communication with the file system and the metadata store, the data management system comprising one or more processors and memory storing instructions, wherein the instructions, when executed by the one or more processors, cause the one or more processors to:

perform a plurality of snapshot operations to the file system, wherein a particular snapshot operation has an interruption, the particular snapshot operation comprises:

incrementing the file-system-level metadata based on changes recorded the particular snapshot operation, and recording a snapshot-level metadata that is specific to the particular snapshot operation, wherein the snapshot-level metadata includes an inaccuracy due to the interruption; and perform a correction operation that is asynchronous to the plurality of snapshot operations to correct the overall status in the file system by adjusting the file-system-level metadata, the correction operation is partially based on determining the inaccuracy of the snapshot-level metadata specific to the particular snapshot.

14. The system of claim 13, wherein each snapshot operation comprises creating data records for file data in the snapshot operation, each data record comprising metadata of the file data, the metadata in the data record comprising information regarding a data size, and wherein a total data size of the file data that are exchanged with the file system in the plurality of snapshot operations is determined based on the information the data size included in the metadata in the data records.

15. The system of claim 14, wherein determining the total data size comprises:

examining metadata of the data records that identify files that are exchanged with the file system in the plurality of snapshot operations;

retrieving the data size in each of the data record for the identified files that are exchanged with the file system in the plurality of snapshot operations; and adding the data sizes to determine the total data size.

16. The system of claim 13, wherein the correction operation comprises:

defining a range of snapshots that are to be included in the correction operation, retrieving the snapshot records corresponding to the snapshots in the range, and summing snapshot-level metadata of the snapshot records as a total of the snapshot-level metadata.

17. The system of claim 13, wherein the at least one of the snapshot operations comprises a plurality of data operations that are performed through one or more application programming interface (API) calls.

18. The system of claim 13, wherein the at least one of the snapshot operations is performed without transaction.

19. The system of claim 13, wherein the file-system-level metadata is saved as part of a file system usage record, and the snapshot-level metadata is saved as part of the snapshot record.

20. A non-transitory computer-readable medium configured to store code comprising instructions for usage correction for a file system, wherein the instructions, when executed by one or more processors, cause the one or more processors to:

maintain a file-system-level metadata for the file system, the file-system-level metadata representing an overall status in the file system;

perform a plurality of snapshot operations to the file system, wherein a particular snapshot operation has an interruption, the particular snapshot operation comprises:

incrementing the file-system-level metadata based on changes recorded the particular snapshot operation, and recording a snapshot-level metadata that is specific to the particular snapshot operation, wherein the snapshot-level metadata includes an inaccuracy due to the interruption; and perform a correction operation that is asynchronous to the plurality of snapshot operations to correct the overall status in the file system by adjusting the file-system-level metadata, the correction operation is partially based on determining the inaccuracy of the snapshot-level metadata specific to the particular snapshot.

* * * * *